US011757762B2

(12) United States Patent
Xiao et al.

(10) Patent No.: US 11,757,762 B2
(45) Date of Patent: Sep. 12, 2023

(54) SERVICE OPERATION METHOD AND DEVICE, AND STORAGE MEDIUM AND ELECTRONIC DEVICE

(71) Applicant: ZTE CORPORATION, Guangdong (CN)

(72) Inventors: Shuchao Xiao, Guangdong (CN); Xiaojian Li, Guangdong (CN); Huanqing Hu, Guangdong (CN)

(73) Assignee: ZTE CORPORATION

( * ) Notice: Subject to any disclaimer, the term of this patent is extended or adjusted under 35 U.S.C. 154(b) by 273 days.

(21) Appl. No.: 17/270,083

(22) PCT Filed: Aug. 22, 2019

(86) PCT No.: PCT/CN2019/101881
§ 371 (c)(1),
(2) Date: Feb. 22, 2021

(87) PCT Pub. No.: WO2020/038425
PCT Pub. Date: Feb. 27, 2020

(65) Prior Publication Data
US 2021/0328912 A1 Oct. 21, 2021

(30) Foreign Application Priority Data
Aug. 22, 2018 (CN) .......................... 201810961394.5

(51) Int. Cl.
*H04L 45/28* (2022.01)
*H04L 45/00* (2022.01)
*H04L 45/48* (2022.01)

(52) U.S. Cl.
CPC .............. *H04L 45/28* (2013.01); *H04L 45/22* (2013.01); *H04L 45/48* (2013.01)

(58) Field of Classification Search
None
See application file for complete search history.

(56) References Cited

U.S. PATENT DOCUMENTS 7,280,481 B2 * 10/2007 Rong ..................... H04L 45/122
 709/241
10,454,830 B2 * 10/2019 Xu ........................... H04L 47/11
(Continued)

FOREIGN PATENT DOCUMENTS

| CN | 1815975 A | 8/2006 |
|---|---|---|
| CN | 1866806 | 11/2006 |

(Continued)

OTHER PUBLICATIONS

Patent Cooperation Treaty (PCT), International Search Report and Written Opinion for Application PCT/CN2019/101881 filed on Aug. 22, 2019, dated Nov. 20, 2019, International Searching Authority, CN.

(Continued)

*Primary Examiner* — Xavier S Wong
(74) *Attorney, Agent, or Firm* — McDonald Hopkins LLC (57) ABSTRACT

Provided are a service operation method, a service operation device a storage medium and an electronic device. The method includes: determining service information about multiple nodes in a distributed network after determining a link failure in the distributed network, computing a restore path centralizedly for services indicated by the service information about the multiple nodes, and operating the services by using the restore path.

16 Claims, 7 Drawing Sheets

(56) References Cited

U.S. PATENT DOCUMENTS

| | | | |
|---|---|---|---|
| 2002/0093954 A1 | 7/2002 | Weil et al. | |
| 2004/0218525 A1* | 11/2004 | Elie-Dit-Cosaque | H04L 41/0631 370/227 |
| 2012/0134263 A1 | 5/2012 | Xiang | |
| 2015/0215200 A1 | 7/2015 | Bottari et al. | |
| 2016/0043934 A1 | 2/2016 | Ubaldi et al. | |
| 2017/0155576 A1* | 6/2017 | Addeo | H04L 45/22 |
| 2020/0044963 A1* | 2/2020 | Kwok | H04L 45/125 |

FOREIGN PATENT DOCUMENTS

| | | |
|---|---|---|
| CN | 1981463 A | 6/2007 |
| CN | 101232517 A | 7/2008 |
| CN | 101286892 A | 10/2008 |
| CN | 101459535 A | 6/2009 |
| CN | 101494801 A | 7/2009 |
| CN | 101645847 A | 2/2010 |
| CN | 101651625 | 2/2010 |
| CN | 101715149 A | 5/2010 |
| CN | 102487329 | 6/2012 |
| CN | 103795629 A | 5/2014 |
| CN | 105066997 A | 11/2015 |
| CN | 106878170 A | 6/2017 |

OTHER PUBLICATIONS

Lu et al., "Relayed CSPF for Mulit-Area Mult-AS PCE," Internet Engineering Task Force, Internet Society 4; No. 1, pp. 1-15 (2011). XP015075571.

Chinese Office Action dated Jul. 30, 2021; Chinese Patent Application No. 201810961394.5.

* cited by examiner

SERVICE OPERATION METHOD AND DEVICE, AND STORAGE MEDIUM AND ELECTRONIC DEVICE

This application is a 35 U.S.C. 371 national stage filing of PCT Application No. PCT/2019/101881 filed on Aug. 22, 2019, which claims priority to Chinese Patent Application No. 201810961394.5 filed with the CNIPA on Aug. 22, 2018, the disclosure of which are incorporated herein by reference in their entireties.

TECHNICAL FIELD

The present disclosure relates to the field of communications and, for example, to a service operation method and a service operation method device, a storage medium and an electronic device.

BACKGROUND

With the continuous development of automatically switched optical network (ASON) technology, more and more service providers use optical network devices in networking, and implement automatic path computation and connection establishment of a call by loading control plane inside nodes. A connection controller (CC) and a path computation element (PCE) are both components of the control plane. The PCE is responsible for completing the computation of the whole call path. According to a computation result of the PCE, the CC completes the establishment of the whole connection by issuing label reservation and cross establishment on each node along the path.

To complete the establishment of one connection, it is necessary to place optical fibers and configure transmission ports between nodes to generate traffic engineering (TE) links. The TE links among multiple nodes flood in the network through open shortest path first (OSPF) interior gateway protocol, thereby generating a topology. After the network state stabilizes, each node generates a topology. The PCE on a head node of the connection computes, according to the topology, an end-to-end path from the head node of the connection to an end node of the connection.

Services are distributed on multiple head nodes. The PCE of each head node is responsible for a service path computation of only the node where each PCE is located. Such technology has two major defects. Firstly, it is easy to cause resource collision. While multiple head nodes establish service connections at the same time, paths computed by PCEs of the multiple head nodes may use an identical network resource (for example, link wavelength or slot). In this way, only the first connection using the resource can be established successfully, while establishments of other service connections fail. Secondly, global resource optimization cannot be performed. Since each PCE knows a service of only the node where each PCE is located, there is no way to optimize the resource allocation to all services in the network from a perspective of the whole network.

In the actual networking environment, there is often such a situation that when one or several optical fibers are broken, a service passing the broken optical fiber(s) may be interrupted. The interrupted service needs to be restored immediately. To minimize the impact of fiber breakage on the network, operators further desire to restore as many services as possible. The distributed PCEs in related art cannot address themselves to such demand.

No effective solution has yet been proposed for the preceding problem in the related art.

SUMMARY

Embodiments of the present disclosure provide a service operation method and a service operation device, a storage medium and an electronic device, so as to solve at least the problem of resource collision and inability to optimize global resources in related art.

An embodiment of the present disclosure provides a service operation method. The method includes: determining service information about multiple nodes in a distributed network after determining a link failure in the distributed network, computing a restore path centralizedly for services indicated by the service information about the multiple nodes, and operating the services by using the restore path.

An embodiment of the present disclosure provides a service operation device. The device includes a determination module, a computation module and an operation module. The determination module is configured to determine service information about multiple nodes in a distributed network after determining a link failure in the distributed network. The computation module is configured to compute a restore path centralizedly for services indicated by the service information about the multiple nodes. The operation module is configured to operate the services by using the restore path.

Another embodiment of the present disclosure further provides a non-transitory storage medium. The non-transitory storage medium stores a computer program. The computer program is configured to, when executed, implement the above-mentioned method.

Another embodiment of the present disclosure further provides an electronic device. The electronic device includes a memory and a processor. The memory stores a computer program. The processor is configured to execute the computer program to implement the above-mentioned method.

BRIEF DESCRIPTION OF DRAWINGS

The drawings described herein are used to provide a further understanding of the present disclosure and form a part of the present application. The illustrative embodiments and the description thereof in the present disclosure are used to explain the present disclosure and not to limit the present disclosure in an improper manner. In the drawings.

DETAILED DESCRIPTION

The present disclosure is described in detail hereinafter with reference to drawings and in combination with embodiments. If not in collision, the embodiments described herein and the features thereof may be combined with each other.

The terms "first", "second" and the like in the specification, claims and above drawings of the present disclosure are used to distinguish between similar objects and are not necessarily used to describe a particular order or sequence.

Figure 1:
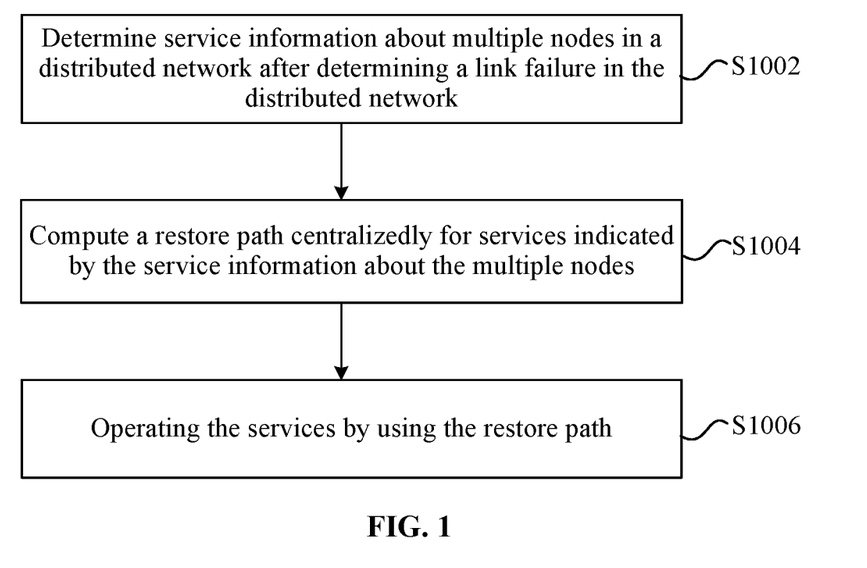
FIG. 1 is a flowchart of a service operation method according to an embodiment of the present disclosure.

An embodiment of the present disclosure provides a service operation method. FIG. 1 is a flowchart of the service operation method according to the embodiment of the present disclosure. As shown in FIG. 1, the process includes the steps described below.

In step S1002, service information about multiple nodes in a distributed network is determined after a link failure in the distributed network is determined.

In step S1004, a restore path is computed centralizedly for services indicated by the service information about the multiple nodes.

In step S1006, the services are operated by using the restore path.

The above steps may be executed by functional modules in the distributed network. Additionally, the steps may be executed by the same functional module or different functional modules. The link failure in the distributed network may be determined by using a PCE in the network. For example, a link flooding message may be monitored by using the PCE in the network, and then, the link failure may be determined according to the monitored message. After the link failure is monitored, a link in failure may be recorded, and appropriate measures may be taken to avoid link state jitter. For example, the measures may include setting a timer. In the above embodiment, service information about all nodes in the distributed network may be determined since in the process of computing the restore path centralizedly, a service path not affected by the link failure may need to be adjusted to restore as many services as possible.

Through the above steps, an automatic, flexible and efficient centralized path computation mode is implemented in a distributed architecture, which can well solve the problem of resource collision in the distributed path computation. In addition, full use of resources can be made through global optimization from a perspective of overall network resources. Therefore, this can solve the problem of resource collision and inability to optimize global resources in related art.

Figure 2:
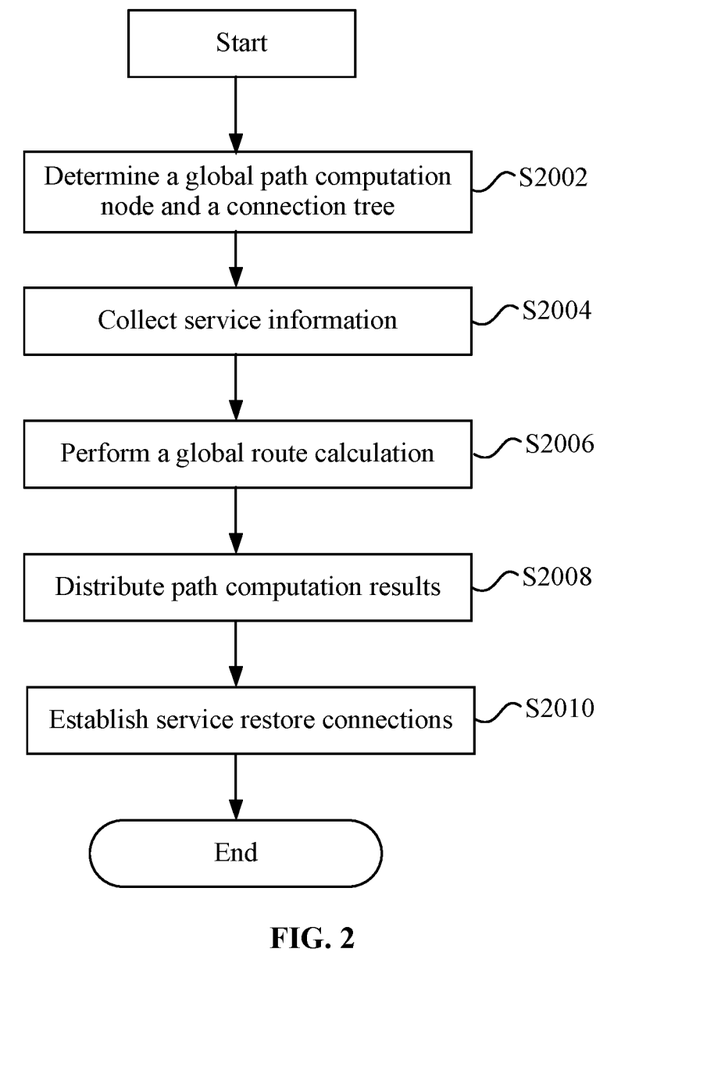
FIG. 2 is a schematic diagram of a general framework for restoring services according to an embodiment of the present disclosure.

In an optional embodiment, the step of determining the service information about the multiple nodes in the distributed network includes: determining a global path computation node and a connection tree of the distributed network; collecting, by using the global path computation node, service information about other nodes excluding the global path computation node in the connection tree; and determining service information about the global path computation node and the service information about the other nodes excluding the global path computation node. In the embodiment, the global path computation node and the connection tree may be determined firstly, and then, services (corresponding to the preceding operated services) may be restored by using the determined global path computation node and the determined connection tree. FIG. 2 is a schematic diagram of a general framework for restoring services according to an embodiment of the present disclosure. As shown in FIG. 2, the process includes the steps described below.

In step S2002, a global path computation node and a connection tree are determined.

In step S2004, service information is collected.

In step S2006, a global route calculation is performed to obtain a path computation result.

In step S2008, the path computation result is distributed. Step S2008 is a specific operation of operating the services by using the restore path. That is, when the services are operated, the path computation result may be distributed to multiple nodes to instruct the multiple nodes to restore services.

In step S2010, service restore connections are established.

As described in the above embodiment, after the link is in failure, appropriate measures may be taken to avoid link state jitter. Optionally, the link state jitter may be avoided by setting a timer as described below.

Before the step of determining the service information about the multiple nodes in the distributed network, the method further includes: setting a first timer corresponding to a first link after monitoring a failure of the first link in the distributed network, and keeping the first link still in a failure state after the first timer expires.

After the step setting the first timer corresponding to the first link and before the step of determining the service information about the multiple nodes in the distributed network, the method further includes: updating the first timer to a second timer corresponding to a second link after monitoring a failure of the second link in the distributed network, and keeping the first link and/or the second link still in a failure state after the second timer expires.

In the above embodiment, if a link failure is monitored, the link in failure is recorded, and the appropriate measures are taken to avoid the link state jitter. The measures include setting the timer. A timing length may be set according to requirements. If already set, the timer is reset. If a link restore is monitored, the link is deleted from records of links in failure. After the timer expires, if there is still a link failure, a topology is deeply traversed by using a current node as a root, so as to generate a connection tree where the current node is located.

In an optional embodiment, the step of determining the global path computation node and the connection tree of the distributed network includes: traversing the topology by using each node as a root, so as to generate a connection tree where each node is located; determining, according to a decision strategy, an initial global path computation node in the connection tree where each node is located; and selecting a target node from the multiple nodes by comparing whether each node is identical to the initial global path computation node in the connection tree where the each node is located; and using the selected target node as the global path computation node, and using the connection tree where the target node is located as the connection tree of the distributed network. The target node is the same as the initial global path computation node in the connection tree where the target node is located. There may exist one or more target nodes.

Optionally, the decision strategy includes at least one of: selecting a node having the smallest node identity (ID) as the global path computation node, selecting a node having the largest ID as the global path computation node, selecting a node having the largest number of link ports as the global path computation node, or selecting a node having the smallest number of link ports as the global path computation node.

Figure 3:
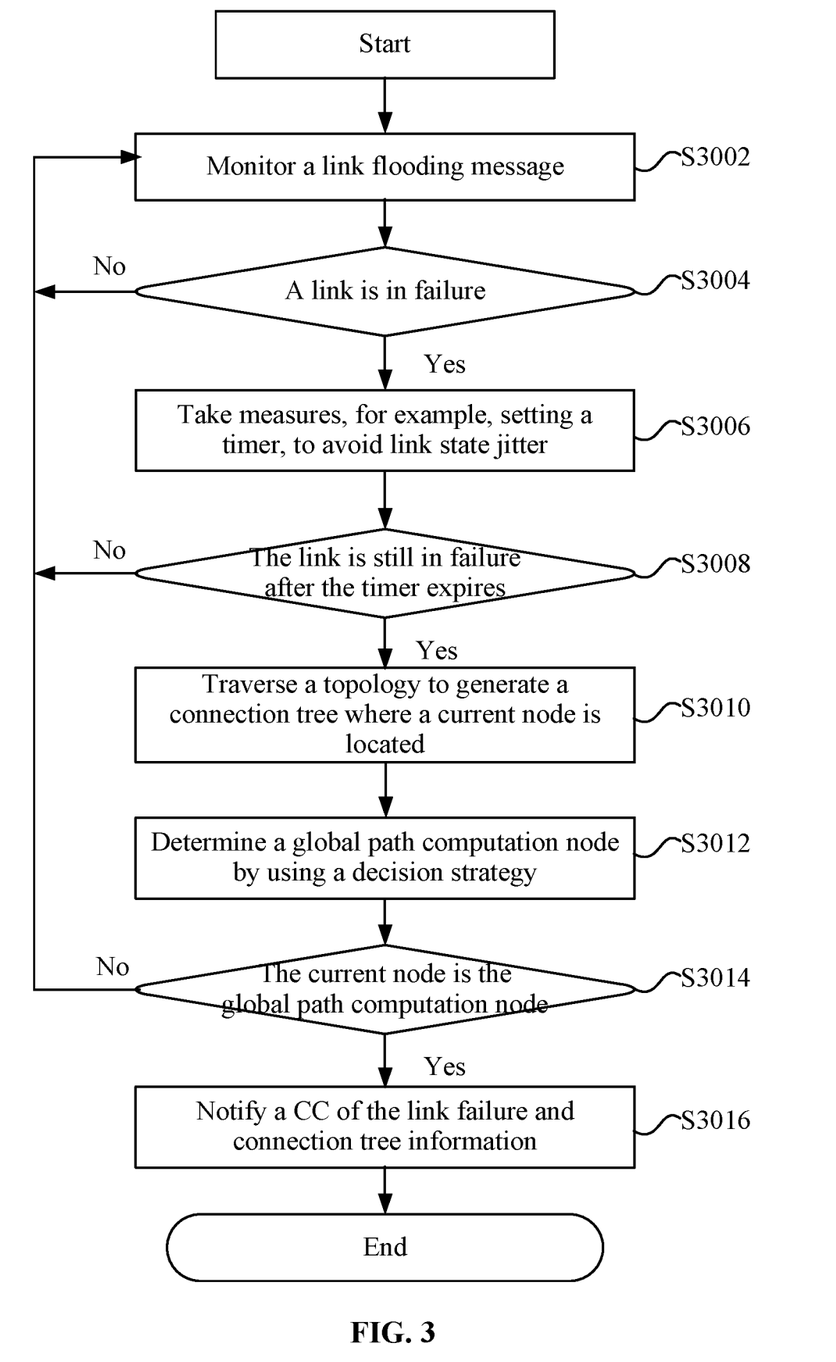
FIG. 3 is a flowchart of a method for determining a global path computation node and a connection tree according to an embodiment of the present disclosure.

How to determine the global path computation node and the connection tree is described below with reference to the drawings. As shown in FIG. 3, a method for determining a global path computation node and a connection tree includes the steps described below.

In step S3002, a link flooding message is monitored.

In step S3004, it is determined, according to the monitored message, whether a link failure occurs; if it is determined that the link failure occurs, the process proceeds to step S3006; and otherwise, the process proceeds to step S3002.

In step S3006, measures, for example, setting a timer, are taken to avoid link state jitter.

In step S3008, it is determined whether the link is still in failure after the timer expires; if it is determined that the link is still in failure, the process proceeds to step S3010; and otherwise, the process proceeds to step S3002.

In step S3010, a topology is traversed to generate a connection tree where a current node is located.

In step S3012, a global path computation node is determined by using a decision strategy. For example, a node having the smallest node ID is determined as the global path computation node.

In step S3014, it is determined whether the current node is a global path computation node of a connection tree where the current node is located; if a determination result is positive, the process proceeds to step S3016; and otherwise, the process proceeds to step S3002.

In step S3016, a CC of the current node is notified of the link failure and corresponding connection tree information. Optionally, the CC of the current node may be notified of the link failure and the corresponding connection tree information by using a PCE of the current node.

Figure 4:
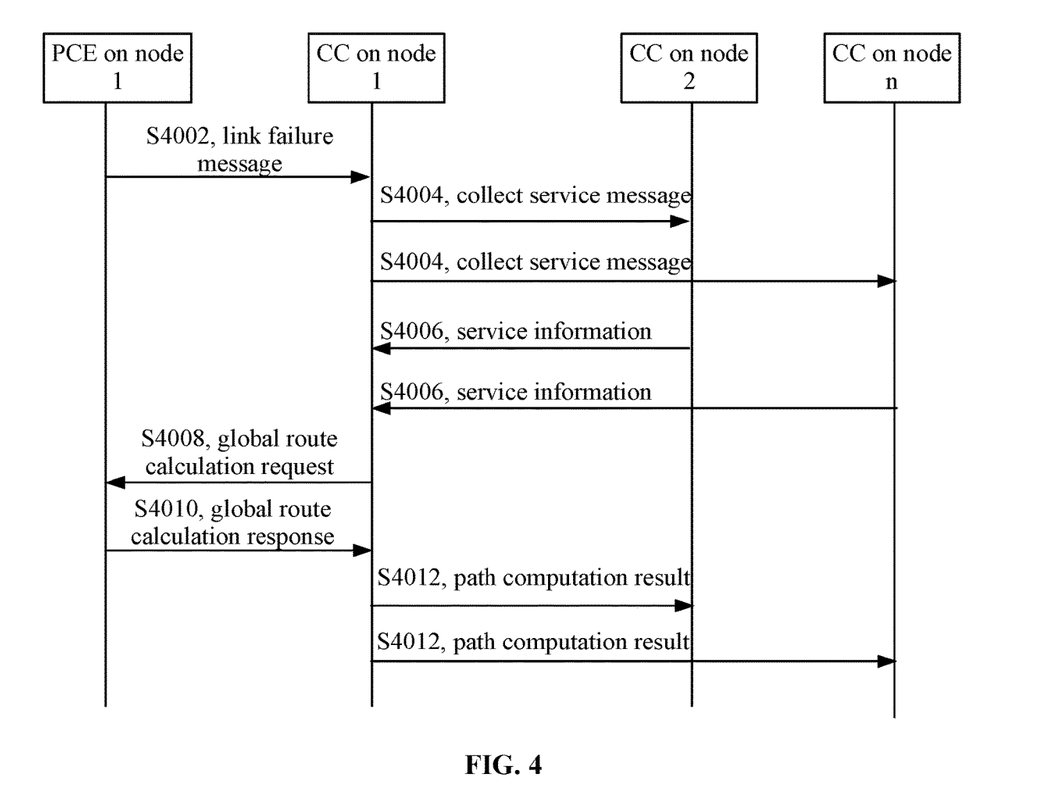
FIG. 4 is a flowchart for collecting service information and distributing route results according to an embodiment of the present disclosure.

In an optional embodiment, the step of collecting, by using the global path computation node, the service information about the other nodes excluding the global path computation node in the connection tree includes: sending, by using the global path computation node, a collect service message for requesting service collection to the other nodes; and receiving, through the global path computation node, the service information about the other nodes returned by the other nodes. In the embodiment, the collect service message may be sent to the other nodes by using a CC of the global path computation node. In an embodiment, after the CC of the global path computation node receives a link failure message from a PCE, collect service (CollectService) messages are sent to all nodes in the connection tree by using appropriate communication channels (including a transmission control protocol (TCP)/Internet protocol (IP), a user datagram protocol (UDP)/IP and the like). When other nodes receive the CollectService messages, a service information (ServiceInfo) message using each of the other nodes as a head node is sent to the message sending node (that is, the global path computation node). Based on all ServiceInfo received by the global path computation node from the other nodes and service information using the global path computation node as a head node, the global path computation node initiates a global route calculation request (GlobalRouteCalcRequest) message to a PCE of the global path computation node to instruct the PCE to compute a restore path centralizedly for services on multiple nodes. For the specific process, refer to FIG. 4. In FIG. 4, node 1 is equivalent to the global path computation node in the embodiment, and nodes 2 to N are equivalent to the other nodes in the embodiment. As shown in FIG. 4, the process includes the steps described below.

In step S4002, a PCE on node 1 sends a link failure message to a CC of node 1.

In step S4004, the CC on node 1 sends collect service messages to CCs of other nodes.

In step S4006, the CC on node 1 collects service information returned by the CCs of the other nodes.

In step S4008, the CC on node 1 initiates a global route calculation request to the PCE on node 1.

In step S4010, the PCE on node 1 returns a global route calculation response to the CC on node 1.

In step S4012, the CC on node 1 sends a path computation result (Restore Service) to the CCs of the other nodes.

In an optional embodiment, the service information includes at least one of: source node information and sink node information about a service, port information about an original node of a service, a signal type, a service priority, a current connection path of a service, or an original connection path of a service.

In an optional embodiment, the step of computing the restore path centralizedly for the services indicated by the service information about the multiple nodes includes: grouping all services according to a preset grouping strategy, and determining an order of all groups according to a preset ordering strategy; and computing a first restore path of each group of services according to the determined order and a preset path computation strategy, and using the first restore path as the restore path.

In an optional embodiment, before the step of grouping of all services and determining the order of all groups according to the preset ordering strategy, the method further includes setting the following information: the maximum number of iterative computations, an initial value 0 of the number of services successful in restore path computation, the path computation strategy and the grouping strategy.

Figure 5:
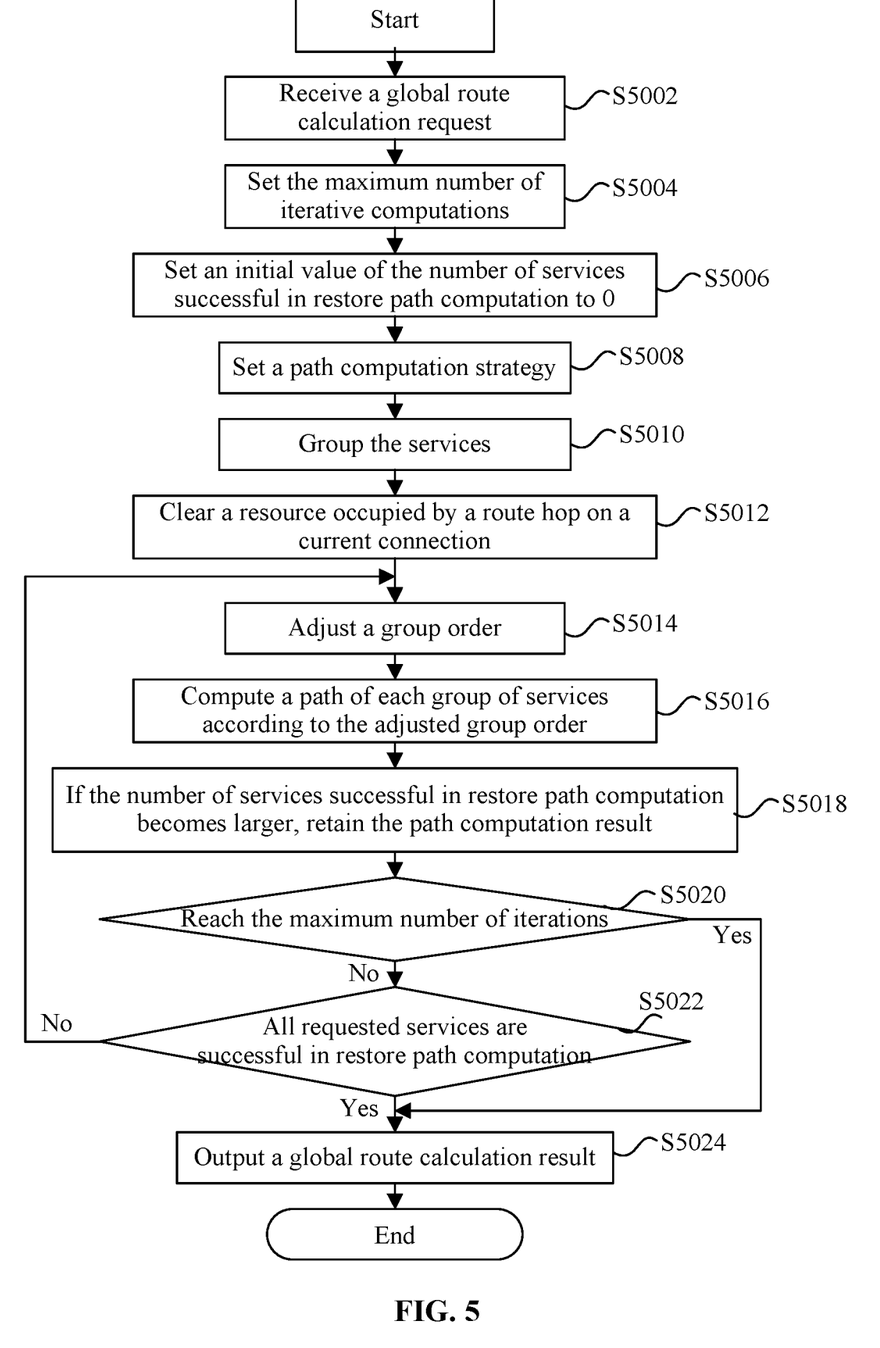
FIG. 5 is a flowchart of a global route calculation according to an embodiment of the present disclosure.

In an optional embodiment, after a step of determining a resource used on the restore path of each group of services, the method further includes: determining a first number of services successfully restored; updating the number of services successful in restore path computation from 0 to the first number; redetermining an order of all groups according to the ordering strategy in at least one of the following cases: the current number of iterative computations does not exceed the maximum number of iterative computations, or there is a service not successfully restored; computing a restore path of each group of services according to the path computation strategy and an order of all groups after regrouping, and determining a second number of services successfully restored; and in response to determining that the second number is greater than the first number, updating the restore path to the restore path of each group of services computed according to the order of all groups after regrouping. In an embodiment, for the process of the global route calculation (that is, computing the restore path centralizedly), refer to FIG. 5. As shown in FIG. 5, the process includes the steps described below.

In step S5002, a PCE receives a global route calculation request message from a CC.

In step S5004, the maximum number of iterations is set.

In step S5006, an initial value of the number of services successful in restore path computation is set to 0.

In step S5008, an appropriate path computation strategy is selected and set. For example, the minimum number of hops is preferred.

In step S5010, services are grouped by using an appropriate principle (corresponding to the grouping strategy).

In step S5012, a topology resource is processed for a global route calculation. For example, if a route hop on a current connection of each service is not in an original connection, a resource occupied by the route hop is cleared. The original connection is a connection after the service is established. The current connection is a connection that the service currently uses.

In step S5014, a group order is adjusted by using an appropriate mechanism (corresponding to the ordering strategy).

In step S5016, a path of each group of services is computed according to the adjusted group order, and a resource used on the path is determined.

In step S5018, if the number of services successful in restore path computation becomes larger, a path computation result is retained.

In step S5020, it is determined whether the maximum number of iterative computations has been reached; if the maximum number of iterative computations has been reached, the process proceeds to step S5024; and otherwise, the process proceeds to step S5022.

In step S5022, it is determined whether all services are successful in restore path computation; if all services are successful in restore path computation, the process proceeds to step S5024; and otherwise, the process proceeds to step S5014.

In step S5024, the last retained path computation result is outputted as a global route calculation result, and a global route calculation response (GlobalRouteCalcResponse) message is returned to the CC.

Optionally, the grouping strategy includes: grouping services having the same source node and the same sink node into one group according to a source node identity (ID) and a sink node ID. Optionally, the ordering strategy includes: ordering randomly or ordering according to priorities of groups.

In an optional embodiment, when the route hop on the current connection of the restored service is not in the original connection, the resource occupied by the route hop is cleared. In another optional embodiment, a wavelength of the original connection of each service can only be used by each service itself when each service is restored.

In an optional embodiment, the step of operating the services by using the restore path includes: sending information about the restore path to the global path computation node; and issuing the information about the restore path to the other nodes by using the global path computation node, so as to instruct the other nodes to operate services of the other nodes according to the information about the restore path. The global path computation node operates a service of the global path computation node according to the information about the restore path. In the embodiment, the CC of the global path computation node may send a RestoreService message to CCs of the other nodes. The RestoreService message contains a restore path computation result for services. After the other nodes receive the RestoreService message, service restore connections are established. The global path computation node also establishes a service restore connection.

Figure 6:
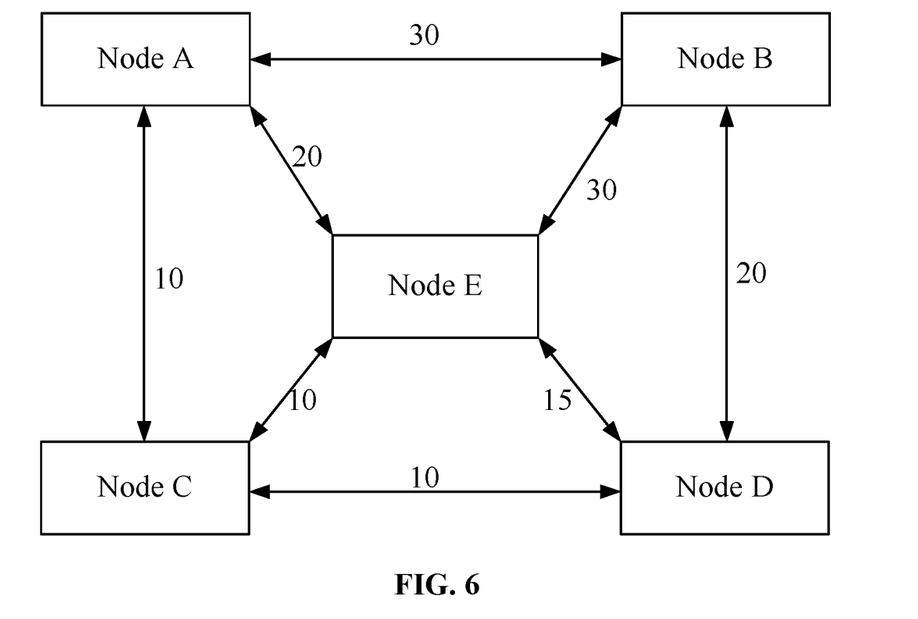
FIG. 6 is a topological diagram according to embodiment one of the present disclosure.
Figure 7:
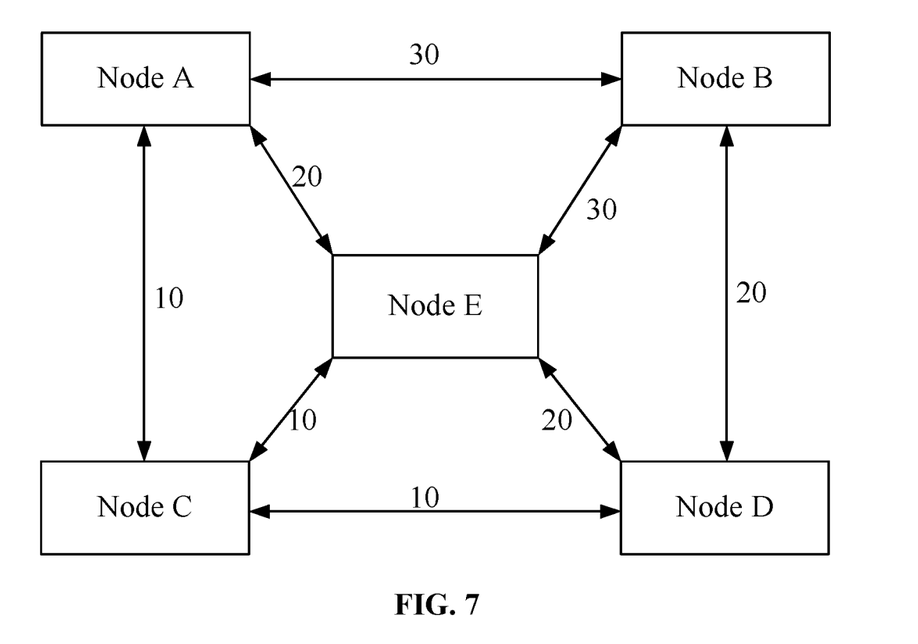
FIG. 7 is a topological diagram according to embodiments two to four of the present disclosure.

The present disclosure is described below in combination with embodiments. FIG. 6 may be used as a topological diagram for embodiment one. FIG. 7 may be used as a topological diagram for embodiments two to four.

Embodiment One: Multi-Service Restore after a Link Failure (the Maximum Number of Iterative Computations is Reached)

As shown in FIG. 6, the topology consists of nodes A, B, C, D and E. A number next to a link is the number of available wavelengths on the link.

Services 1 to 10: a path is A-E-C. Links AE and EC occupy 10 wavelengths.

Services 11 to 20: a path is A-E-D. Links AE and ED occupy 10 wavelengths.

Services 21 to 30: a path is B-D. Link BD occupies 10 wavelengths.

Services 31 to 40: a path is B-D-C. Links BD and DC occupy 10 wavelengths.

Now links A-E and B-D are in failure.

In step 1, a global path computation node and a connection tree are determined.

In step S101, a PCE module on node A monitors a link flooding message.

In step S102, a failure of link A-E is monitored, link AE in failure is recorded, and a timer is set to 10 seconds. The timing length may be set according to requirements.

In step S103, a failure of link B-D is monitored, and link BD in failure is recorded. The timer is reset to 10 seconds.

In step S104, after the timer expires, the PCE on node A finds that links AE and BD are still in failure, and then, the topology is deeply traversed by using current node A as a root, so as to obtain a connection tree [A, B, E, D, C].

In step S105, since current node A is a node having the smallest node ID in the connection tree, the PCE notifies a CC of the link failure (LinkFailure) and the fact that the connection tree is [A, B, E, D, C] and node A having the smallest node ID in the connection tree is the global path computation node.

In step 2, service information is collected.

In step S201, after the CC on global path computation node A receives the link failure message from the PCE, collect service (CollectService) messages are sent to all other nodes [B, E, D, C] in the connection tree.

In step S202, after the other nodes receive the CollectService messages, service information (ServiceInfo) messages using the other nodes as head nodes are returned to the message sending node. Service information includes a source node and a sink node of a service, a port of a service, a signal type, a priority, a current connection path, an original connection path and the like.

In step 203, based on all ServiceInfo received by the global path computation node A from the other nodes and service information using the global path computation node A as a head node, the global path computation node A initiates a global route calculation request (GlobalRouteCalcRequest) message to the PCE.

In step 3, a global route calculation is performed.

In step S301, the PCE on the global path computation node receives the global route calculation request message from the CC.

In step S302, the maximum number of iterative computations is set to 3.

In step S303, an initial value of the number of services successful in restore path computation is set to 0.

In step S304, a path computation strategy is set such that the minimum number of hops is preferred.

In step S305, services are grouped according to a source node ID and a sink node ID, and services having the same source node and the same sink node are set into one group. There are four groups AC, AD, BD and BC.

In step S306, for a route hop on a current connection of each service, if the route hop is not in an original connection, a resource occupied by the route hop is cleared. For a current service, if a current connection is the same as an original connection, it is not necessary to clear a resource.

In step S307, a group order (AC, AD, BC, BD) is randomly generated, and the groups are reordered.

In step S308, according to the adjusted group order, a path of each group of services is computed, and a resource used on the path is determined. The wavelength of the original connection can be used by only this service when restored.

Service group AC uses a restore path A-C.

Service group AC uses a restore path A-B-E-D.

Service group BC uses a restore path B-E-D-C. However, only 5 services can be restored.

Service group BD has no available restore paths.

In step S309, since the number of services successful in restore path computation is 25, which is greater than 0 in the last time, the newest path computation result is retained.

In step S310, the number of iterative computations is 1, which does not reach the maximum number 3 of iterative computations, the number of restored services does not reach the number 40 of requested services, and then, the process proceeds to step S307 (the steps in the second iterative computation are denoted as S307' to S310', and the steps in the third iterative computation are denoted as S307" to S310").

In step S307', a group order (BC, AC, AD, BD) is randomly generated, and the groups are reordered.

In step S308', according to the adjusted group order, a path of each group of services is computed, and a resource used on the path is determined. The wavelength of the original connection can be used by only this service when restored.

Service group BC uses a restore path B-A-C.

Service group AC uses a restore path A-B-E-C.

Service group AD uses a restore path A-B-E-D.

Service group BD uses a restore path B-E-D. However, only 5 services can be restored.

In step S309', since the number of services successful in restore path computation is 35, which is greater than 25 in the last time, the newest path computation result is retained.

In step S310', the number of iterative computations is 2, which does not reach the maximum number 3 of iterative computations, the number of restored services does not reach the number 40 of requested services, and then, the process proceeds to step S307.

In step S307", a group order (AC, AD, BD, BC) is randomly generated, and the groups are reordered.

In step S308", according to the adjusted group order, a path of each group of services is computed, and a resource used on the path is determined. The wavelength of the original connection can be used by only this service when restored.

Service group AC uses a restore path A-C.

Service group AD uses a restore path A-B-E-D.

Service group BD used a restore path B-E-D. However, only 5 services can be restored.

Service group BD has no available restore paths.

In step S309", since the number of services successful in restore path computation is 25, which is less than 35 in the last time, the newest path computation result is not retained.

In step S310", the number of iterative computations is 3, which reaches the maximum number 3 of iterative computations, and then, the process proceeds to step S312.

In step S312, the last retained path computation result is outputted as a global route calculation result, and a global route calculation response (GlobalRouteCalcResponse) message is returned to the CC.

In step 4, the path computation result is distributed.

In step S401, the CC of the global path computation node sends RestoreService messages to CCs of other nodes. The RestoreService messages contain the restore path computation result of services.

In step S402, after the other nodes receive the RestoreService messages, service restore connections are established. Additionally, the global path computation node also establishes a service restore connection.

Embodiment Two: Multi-Service Restore after a Link Failure (all Requested Services are Successful in Restore Path Computation)

As shown in FIG. 7, the topology consists of nodes A, B, C, D and E. A number next to a link is the number of available wavelengths on the link.

Services 1 to 10: a path is A-E-C. Links AE and EC occupy 10 wavelengths.

Services 11 to 20: a path is A-E-D. Links AE and ED occupy 10 wavelengths.

Services 21 to 30: a path is B-D. Link BD occupies 10 wavelengths.

Services 31 to 40: a path is B-D-C. Links BD and DC occupy 10 wavelengths.

Now links A-E and B-D are in failure.

In step 1, a global path computation node and a connection tree are determined.

In step S101, a PCE module on node A monitors a link flooding message.

In step S102, a failure of link A-E is monitored, link AE in failure is recorded, and a timer is set to 10 seconds. The timing length may be set according to requirements.

In step S103, a failure of link B-D is monitored, and link BD in failure is recorded. The timer is reset to 10 seconds.

In step S104, after the timer expires, the PCE on node A finds that links AE and BD are still in failure, and then, the topology is deeply traversed by using current node A as a root, so as to obtain a connection tree [A, B, E, D, C].

In step S105, since current node A is a node having the smallest node ID in the connection tree, the PCE notifies a CC of the link failure (LinkFailure) and the fact that the connection tree is [A, B, E, D, C] and node A having the smallest node ID in the connection tree is the global path computation node.

In step 2, service information is collected.

In step S201, after the CC on global path computation node A receives the link failure message from the PCE, collect service (CollectService) messages are sent to all other nodes [B, E, D, C] in the connection tree.

In step S202, after the other nodes receive the CollectService messages, service information (ServiceInfo) messages using the other nodes as head nodes are returned to the message sending node. Service information includes a source node and a sink node of a service, a port of a service, a signal type, a priority, a current connection path, an original connection path and the like.

In step 203, based on all ServiceInfo received by the global path computation node A from other nodes and service information using the global path computation node A as a head node, the global path computation node A initiates a global route calculation request (GlobalRouteCalcRequest) message to the PCE.

In step 3, a global route calculation is performed.

In step S301, the PCE on the global path computation node receives the global route calculation request message from the CC.

In step S302, the maximum number of iterative computations is set to 3.

In step S303, an initial value of the number of services successful in restore path computation is set to 0.

In step S304, a path computation strategy is set such that the minimum number of hops is preferred.

In step S305, services are grouped according to a source node ID and a sink node ID, and services having the same source node and the same sink node are set into one group. There are four groups AC, AD, BD and BC.

In step S306, for a route hop on a current connection of each service, if the route hop is not in an original connection, a resource occupied by the route hop is cleared. For a current service, if a current connection is the same as an original connection, it is not necessary to clear a resource.

In step S307, a group order (BC, AC, AD, BD) is randomly generated, and the groups are reordered.

In step S308, according to the adjusted group order, a path of each group of services is computed, and a resource used on the path is determined. The wavelength of the original connection can be used by only this service when restored.

Service group BC used a restore path B-A-C.
Service group AC used a restore path A-B-E-C.
Service group AD uses a restore path A-B-E-D.
Service group BD used a restore path B-E-D.

In step S309, since the number of services successful in restore path computation is 40, which is greater than 0 in the last time, the newest path computation result is retained.

In step S310, the number of iterative computations is 1, which does not reach the maximum number 3 of iterative computations, but all requested services are successful in restore path computation, and then, the process proceeds to step S312.

In step S312, the last retained path computation result is outputted as a global route calculation result, and a global route calculation response (GlobalRouteCalcResponse) message is returned to the CC.

In step 4, the path computation result is distributed.

In step S401, the CC of the global path computation node sends RestoreService messages to CCs of other nodes, and the RestoreService messages contain the restore path computation result of services.

In step S402, after the other nodes receive the RestoreService messages, service restore connections are established. Additionally, the global path computation node also establishes a service restore connection.

Embodiment Three: Multi-Service Restore after a Link Failure (a Topology Turns to Multiple Connection Trees)

As shown in FIG. 7, the topology consists of nodes A, B, C, D and E. A number next to a link is the number of available wavelengths on the link.

Services 1 to 10: a path is A-E-C. Links AE and EC occupy 10 wavelengths.

Services 11 to 20: a path is A-E-D. Links AE and ED occupy 10 wavelengths.

Services 21 to 30: a path is B-D. Link BD occupies 10 wavelengths.

Services 31 to 40: a path is B-D-C. Links BD and DC occupy 10 wavelengths.

Now links A-B, A-E, C-E, C-D and B-D are in failure.

In step 1, a global path computation node and a connection tree are determined.

In step S101, PCE modules on nodes A and B monitor a link flooding message.

In step S102, a failure of link A-B is monitored, link AB in failure is recorded, and a timer is set to 10 seconds. The timing length may be set according to requirements.

In step S103, a failure of link A-E is monitored, and link AE in failure is recorded. The timer is reset to 10 seconds.

In step S104, a failure of link C-E is monitored, and link CE in failure is recorded. The timer is reset to 10 seconds.

In step S105, a failure of link C-D is monitored, and link CD in failure is recorded. The timer is reset to 10 seconds.

In step S106, a failure of link B-D is monitored, and link BD in failure is recorded. The timer is reset to 10 seconds.

In step S107, after the timer expires, the PCE on node A finds that links AB, AE, CE, CD and BD are still in failure, and then, the topology is deeply traversed by using current node A as a root, so as to obtain a connection tree [A, C].

In step S108, after the timer expires, the PCE on node B finds that links AB, AE, CE, CD and BD are still in failure, and then, the topology is deeply traversed by using current node B as a root, so as to obtain a connection tree [B, E, D].

In step S109, since node A is a node having the smallest node ID in the connection tree where node A is located, the PCE on node A notifies a CC of the link failure (LinkFailure) and the fact that the connection tree is [A, C] and node A having the smallest node ID in the connection tree is the global path computation node.

In step S110, since node B is a node having the smallest node ID in the connection tree where node B is located, the PCE on node B notifies a CC of the link failure (LinkFailure) and the fact that the connection tree is [B, E, D] and node B having the smallest node ID in the connection tree is the global path computation node.

In step 2, service information is collected.

In step S201, after the CC on global path computation node A receives the link failure message from the PCE, a collect service (CollectService) message is sent to the other node [C] in the connection tree; and after the CC on global path computation node B receives the link failure message from the PCE, collect service (CollectService) messages are sent to all other nodes [E, D] in the connection tree.

In step S202, after other nodes receive the CollectService messages, service information (ServiceInfo) messages using the other nodes as head nodes are returned to the message sending nodes. The service information includes a source node and a sink node of a service, a port of a service, a signal type, a priority, a current connection path, an original connection path and the like.

In step 203, based on ServiceInfo received by the global path computation node A from the other node and service information using global path computation node A as a head node, the global path computation node A initiates a global route calculation request (GlobalRouteCalcRequest) message to the PCE; and based on all ServiceInfo received by the global path computation node B from the other nodes and service information using global path computation node B as a head node, the global path computation node B initiates a global route calculation request (GlobalRouteCalcRequest) message to the PCE.

In step 3, a global route calculation is performed.

In step S301, the PCE on global path computation node A receives the global route calculation request message from the CC; and the PCE on global path computation node B receives the global route calculation request message from the CC.

In step S302, the maximum number of iterative computations is set to 1.

In step S303, an initial value of the number of services successful in restore path computation is set to 0.

In step S304, a path computation strategy is set such that the minimum number of hops is preferred.

In step S305, services are grouped according to a source node ID and a sink node ID, and services having the same source node and the same sink node are set into one group. Service groups on global path computation node A are AC and AD. Service groups on global path computation node B are BD and BC.

In step S306, for a route hop on a current connection of each service, if the route hop is not in an original connection, a resource occupied by the route hop is cleared. For a current service, if a current connection is the same as an original connection, it is not necessary to clear a resource.

In step S307, a group order (AC, AD) is randomly generated on node A, and the groups are reordered; and a group order (BC, BD) is randomly generated on node B, and the groups are reordered.

In step S308, according to the adjusted group orders, a path of each group of services is computed, and a resource used on the path is determined. The wavelength of the original connection can be used by only this service when restored.

For global path computation node A:
Service group AC uses a restore path A-C; and
Service group AD has no restore paths.
For global path computation node B:
Service group BC has no restore paths; and
Service group BD uses a restore path B-E-D.

In step S309, it is determined on nodes A and B separately such that since the number of services successful in restore path computation is 10, which is greater than 0 in the last time, the last path computation result is retained.

In step S310, it is determined on nodes A and B separately such that the number of iterative computations is 1, which reaches the maximum number 1 of iterative computations, and then, the process proceeds to step S312.

In step S312, last retained path computation results are outputted as global route calculation results, and global route calculation response (GlobalRouteCalcResponse) messages are returned to the CCs.

In step 4, the path computation results are distributed.

In step S401, the CC on global path computation node A sends a RestoreService message to a CC of the other node, and the RestoreService message contains the restore path computation result of services; and the CC on global path computation node B sends RestoreService messages to CCs of the other nodes, and the RestoreService messages contain the restore path computation result of services.

In step S402, after other nodes receive the RestoreService messages, service restore connections are established. Additionally, the global path computation nodes also establish service restore connections.

Embodiment Four: Global Path Computation Node Election (not Node is Elected as a Global Path Computation Node)

As shown in FIG. 7, the topology consists of nodes A, B, C, D and E. A number next to a link is the number of available wavelengths on the link.

Services 1 to 10: a path is A-E-C. Links AE and EC occupy 10 wavelengths.
Services 11 to 20: a path is A-E-D. Links AE and ED occupy 10 wavelengths.
Services 21 to 30: a path is B-D. Link BD occupies 10 wavelengths.
Services 31 to 40: a path is B-D-C. Links BD and DC occupy 10 wavelengths.

Now links A-E and B-D are in failure.

In step 1, a global path computation node and a connection tree are determined.

In step S101, a PCE module on node B monitors a link flooding message.

In step S102, a failure of link A-E is monitored, link AE in failure is recorded, and a timer is set to 10 seconds. The timing length may be set according to requirements.

In step S103, a failure of link B-D is monitored, and link BD in failure is recorded. The timer is reset to 10 seconds.

In step S104, after the timer expires, the PCE on node B finds that links AE and BD are still in failure, and then, the topology is deeply traversed by using current node B as a root, so as to obtain a connection tree [B, E, D, C, A].

In step S105, since current node B is not a node having the smallest node ID in the connection tree, the PCE does not notify a CC of the link failure (LinkFailure). That is, node B cannot be used as a global path computation node.

From the description of the embodiments above, it will be apparent to those having ordinary skill in the art that the method of the embodiments above may be implemented by means of software plus a general-purpose hardware platform, or may of course be implemented by hardware. Based on this understanding, the solution of the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to each embodiment of the present disclosure.

An embodiment further provides a service operation device. The device is configured to implement the embodiments and implementations above. What has been described is not repeated. As used below, the term "module" may be software, hardware or a combination of software and hardware capable of implementing predetermined functions. The device described below in the embodiment may be implemented by software, but implementation by hardware or by a combination of software and hardware is also possible and conceived.

Figure 8:
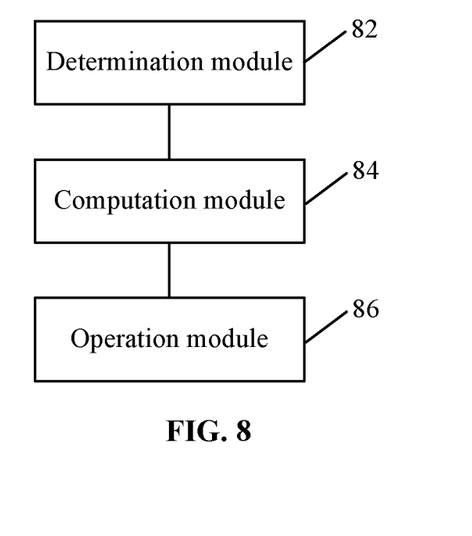
FIG. 8 is a block diagram of a service operation device according to an embodiment of the present disclosure.

FIG. 8 is a block diagram of a service operation device according to an embodiment of the present disclosure. As shown in FIG. 8, the device includes a determination module 82, a computation module 84 and an operation module 86.

The determination module 82 is configured to determine service information about multiple nodes in a distributed network after determining a link failure in the distributed network. The computation module 84 is configured to compute a restore path centralizedly for services indicated by service information about the multiple nodes. The operation module 86 is configured to operate the services by using the restore path.

In an optional embodiment, the determination module 82 includes a first determination unit, a collection unit and a second determination unit. The first determination unit is configured to determine a global path computation node and a connection tree of the distributed network. The collection module is configured to collect, by using the global path computation node, service information about other nodes excluding the global path computation node in the connection tree. The second determination unit is configured to determine service information about the global path computation node and the service information about the other nodes excluding the global path computation node.

In an optional embodiment, the device is further configured to, before determining the service information about the multiple nodes in the distributed network, set a first timer corresponding to a first link after monitoring a failure of the first link in the distributed network, and keep the first link still in a failure state after the first timer expires.

In an optional embodiment, the device is further configured to, after setting the first timer corresponding to the first link and before determining the service information about the multiple nodes in the distributed network, update the first timer to a second timer corresponding to a second link after monitoring a failure of the second link in the distributed network, and keep the first link and/or the second link still in a failure state after the second timer expires.

In an optional embodiment, the first determination unit may determine the global path computation node and the connection tree of the distributed network in the following manner: traversing a topology by using each node as a root, so as to generate a connection tree where each node is located; determining, according to a decision strategy, an initial global path computation node in the connection tree where each node is located; and selecting a target node from the multiple nodes by comparing whether each node is identical to the initial global path computation node in the connection tree where the each node is located; and using the selected target node as the global path computation node, and using the connection tree where the target node is located as the connection tree of the distributed network. The target node is the same as an initial global path computation node in the connection tree where the target node is located. There may exist one or more target nodes.

In an optional embodiment, the decision strategy includes at least one of: selecting a node having the smallest node identity (ID) as the global path computation node, selecting a node having the largest ID as the global path computation node, selecting a node having the largest number of link ports as the global path computation node, or selecting a node having the smallest number of link ports as the global path computation node.

In an optional embodiment, the collection unit may collect the service information about the other nodes excluding the global path computation node in the connection tree in the following manner: sending, by using the global path computation node, a collect service message for requesting service collection to the other nodes; and receiving, through the global path computation node, the service information about the other nodes returned by the other nodes.

In an optional embodiment, the service information includes at least one of: source node information and sink node information about a service, port information about an original node of a service, a signal type, a service priority, a current connection path of a service, or an original connection path of a service.

In an optional embodiment, the computation module 84 may compute the restore path centralizedly for the services indicated by the service information about the multiple nodes in the following manner: grouping all services according to a preset grouping strategy, and determining an order of all groups according to a preset ordering strategy; and computing a first restore path of each group of services according to the determined order and the preset path computation strategy, and using the first restore path as the restore path.

In an optional embodiment, the device is further configured to, before grouping all services and determining the order of all groups, set the following information: the maximum number of iterative computations, an initial value 0 of the number of services successful in restore path computation, the path computation strategy and the grouping strategy.

In an optional embodiment, the device is further configured to, after determining a resource used on the restore path of each group of services, determine a first number of services successfully restored, update the number of services successful in restore path computation from 0 to the first number; redetermine an order of all groups according to the ordering strategy in at least one of the following cases: a current number of iterative computations does not exceed the maximum number of iterative computations, or there is a service not successfully restored; compute a restore path of each group of services according to the path computation strategy and the order of all groups after regrouping, and determine a second number of services successfully restored; and in response to determining that the second number is greater than the first number, update the restore path to the restore path of each group of services computed according to the order of all groups after regrouping.

In an optional embodiment, the grouping strategy includes: grouping services having the same source node and the same sink node into one group according to a source node identity (ID) and a sink node ID.

In an optional embodiment, the ordering strategy includes: ordering randomly or ordering according to priorities of groups.

In an optional embodiment, when a route hop on a current connection of a restore service is not in an original connection, a resource occupied by the route hop is cleared.

In an optional embodiment, a wavelength of an original connection of each service can only be used by each service itself when each service is restored.

In an optional embodiment, the operation module 86 may operate the services in the following manner: sending information about the restore path to the global path computation node; and issuing the information about the restore path to the other nodes by using the global path computation node, so as to instruct the other nodes to operate services of the other nodes according to the information about the restore path. The global path computation node operates a service of the global path computation node according to the information about the restore path.

Each module above may be implemented by software or hardware. Implementation by hardware may, but may not necessarily, be realized in the following manner: the various modules above are all located in the same processor or located in different processors in any combination form.

An embodiment of the present disclosure further provides a storage medium. The storage medium stores a computer program. The computer program is configured to, when executed, implement the steps in any method embodiment above.

Optionally, in the embodiment, the storage medium may include, but is not limited to, various media capable of storing the computer program, such as a universal serial bus flash disk (USB disk), an ROM, an RAM, a mobile hard disk, a magnetic disk, and an optical disk.

An embodiment of the present disclosure further provides an electronic device. The electronic device includes a memory and a processor. The memory stores a computer program. The processor is configured to execute the computer program to implement the steps in any method embodiment above.

Optionally, the electronic device may further include a transmission device and an input/output device. Both the transmission device and the input/output device are connected to the processor.

Optionally, for specific examples in the embodiment, refer to the examples described in the embodiments and optional implementations above, which are not repeated in the embodiment.

Apparently, those have ordinary skill in the art should understand that the modules or steps of the present disclosure above may be implemented by a general-purpose computing apparatus. The modules or steps may be concentrated on a single computing apparatus or distributed on a network composed of multiple computing apparatuses. Optionally, the modules or steps may be implemented by program codes executable by the computing apparatus, so that the modules or steps may be stored in a storage apparatus and executed by the computing apparatus. Moreover, in some circumstances, the illustrated or described steps may be executed in sequences different from those described herein, or the module or steps may be separately made into one or more integrated circuit modules, or multiple modules or steps therein may be made into a single integrated circuit module for implementation. Therefore, the present disclosure is not limited to any particular combination of hardware and software.

What is claimed is:

1. A service operation method, comprising:
    determining service information about a plurality of nodes in a distributed network after determining a link failure in the distributed network;
    wherein determining the service information about the plurality of nodes in the distributed network comprises:
        determining a global path computation node and a connection tree of the distributed network;
        collecting, by using the global path computation node, service information about other nodes excluding the global path computation node in the connection tree from the other nodes, wherein the service information about the other nodes indicates a plurality of services whose paths use the other nodes as head nodes; and
        determining service information about the global path computation node and the service information about the other nodes, wherein the service information about the global path computation node indicates a service whose path uses the global path computation node as a head node;
    computing a plurality of restore paths for all services indicated by the service information about the plurality of nodes in a centralized manner; and
    operating the all services by using the plurality of restore paths.

2. The service operation method of claim 1, before determining the service information about the plurality of nodes in the distributed network, the method further comprising:
    setting a first timer corresponding to a first link after monitoring a failure of the first link in the distributed network; and
    keeping the first link still in a failure state after the first timer expires.

3. The service operation method of claim 2, after setting the first timer corresponding to the first link and before determining the service information about the plurality of nodes in the distributed network, the method further comprising:
    updating the first timer to a second timer corresponding to a second link after monitoring a failure of the second link in the distributed network; and
    keeping at least one of the first link or the second link still in a failure state after the second timer expires.

4. The service operation method of claim 1, wherein determining the global path computation node and the connection tree of the distributed network comprises:
    traversing a topology by using each node of the plurality nodes as a root, so as to generate a connection tree where the each node is located;
    determining, according to a decision strategy, an initial global path computation node in the connection tree where the each node is located; and
    selecting a target node from the plurality of nodes by comparing whether each node is identical to the initial global path computation node in the connection tree where the each node is located, using the selected target node as the global path computation node, and using the connection tree where the target node is located as the connection tree of the distributed network, wherein the target node is same as the initial global path computation node in the connection tree where the target node is located, and one or more target nodes exist.

5. The service operation method of claim 4, wherein the decision strategy comprises at least one of the following:
    selecting a node having a smallest node identity (ID) as the global path computation node;
    selecting a node having a largest node ID as the global path computation node;
    selecting a node having a largest number of link ports as the global path computation node; or
    selecting a node having a smallest number of link ports as the global path computation node.

6. The service operation method of claim 1, wherein collecting, by using the global path computation node, the service information about the other nodes excluding the global path computation node in the connection tree from the other nodes comprises:
    sending, by using the global path computation node, a collect service message for requesting service collection to the other nodes; and
    receiving, through the global path computation node, the service information about the other nodes returned by the other nodes.

7. The service operation method of claim 1, wherein the service information comprises at least one of the following:
    source node information and sink node information about a service, port information about an original node of a service, a signal type, a service priority, a current connection path of a service, or an original connection path of a service.

8. The service operation method of claim 1, wherein computing the plurality of restore paths for the all services indicated by the service information about the plurality of nodes in the centralized manner comprises:
    grouping the all services according to a preset grouping strategy, and determining an order of all groups according to a preset ordering strategy; and computing a first restore path of each group of services according to the determined order and a preset path computation strategy, and using the first restore path of each group as the restore path of the each group.

9. The service operation method of claim 8, before grouping the all services and determining the order of the all groups, the method further comprising:

setting a maximum number of iterative computations, setting an initial value of a number of services successful in restore path computation to 0, setting the path computation strategy, and setting the grouping strategy.

10. The service operation method of claim 9, after determining a resource used on the restore path of the each group of services, the method further comprising:

determining a first number of services successfully restored;

updating the number of services successful in restore path computation from 0 to the first number;

redetermining an order of all groups according to the ordering strategy in at least one of the following cases:

a current number of iterative computations does not exceed the maximum number of iterative computations, or a service not successfully restored exists;

computing a restore path of each group of services according to the path computation strategy and the order of the all groups after regrouping, and determining a second number of services successfully restored; and in response to determining that the second number is greater than the first number, updating the restore path to the restore path of the each group of services computed according to the order of the all groups after the regrouping.

11. The service operation method of claim 8, wherein the grouping strategy comprises: grouping services having a same source node and a same sink node into one group according to a source node identity (ID) and a sink node ID; and the ordering strategy comprises: ordering randomly, or ordering according to priorities of groups.

12. The service operation method of claim 8, further comprising at least one of the following:

in a case where a route hop on a current connection of a restored service is not in an original connection, clearing a resource occupied by the route hop; or enabling a wavelength of an original connection of each service to be used by only the each service when the each service is restored.

13. The service operation method of claim 1, wherein operating the all services by using the plurality of restore paths comprises:

sending information about the plurality of restore paths to the global path computation node; and issuing the information about the plurality of restore paths to the other nodes by using the global path computation node, so as to instruct the other nodes to operate services of the other nodes according to the information about the plurality of restore paths, wherein the global path computation node operates a service of the global path computation node according to the information about the plurality of restore paths.

14. A service operation device, comprising a processor and a memory, wherein the storage device stores processor-executable program, and the program comprise:

a determination module, which is configured to determine service information about a plurality of nodes in a distributed network after determining a link failure in the distributed network;

wherein the determination module comprises:

a first determination unit, which is configured to determine a global path computation node and a connection tree of the distributed network;

a collection module, which is configured to collect, by using the global path computation node, service information about other nodes excluding the global path computation node in the connection tree from the other nodes, wherein the service information about the other nodes indicates a plurality of services whose path use the other nodes as head nodes; and a second determination unit, which is configured to determine service information about the global path computation node and the service information about the other nodes, wherein the service information about the global path computation node indicates a service whose path uses the global path computation node as a head node;

a computation module, which is configured to compute a plurality of restore paths for all services indicated by the service information about the plurality of nodes in a centralized manner; and an operation module, which is configured to operate the all services by using the plurality of restore paths.

15. A non-transitory storage medium, which stores a computer program, wherein the computer program is configured to, when executed, implement the service operation method of claim 1.

16. An electronic device, comprising a memory and a processor, wherein the memory stores a computer program, and the processor is configured to execute the computer program to implement the service operation method of claim 1.

* * * * *